United States Patent [19]

Shust et al.

[11] Patent Number: 5,069,538
[45] Date of Patent: Dec. 3, 1991

[54] AERODYNAMIC DEFLECTOR FOR A REAR VIEW MIRROR WITH AN INTEGRAL SIDE MARKER LIGHT

[75] Inventors: Deborah J. Shust; Robert J. Selzer; Dennis A. Adamisin, all of Fort Wayne, Ind.

[73] Assignee: Navistar International Transportation Corp., Chicago, Ill.

[21] Appl. No.: 474,175

[22] Filed: Feb. 2, 1990

[51] Int. Cl.$^5$ .................................................. G02B 7/18
[52] U.S. Cl. ...................................... 359/871; 359/509
[58] Field of Search ........................... 350/627–637, 350/580, 590, 319, 582–584, 600–610, 97–98, 100–109, 589, 638, 640–642, 258–265, ; 362/83–83.3, 135–143, 84

[56] References Cited

U.S. PATENT DOCUMENTS

| | | | |
|---|---|---|---|
| 1,934,998 | 11/1933 | Knecht | 350/584 |
| 2,878,726 | 3/1959 | Tuthill | 350/582 |
| 4,311,362 | 1/1982 | LaPorte | 350/632 |
| 4,438,760 | 3/1984 | Radebold | 350/629 |
| 4,449,796 | 5/1984 | Janssen et al. | 350/582 |
| 4,490,013 | 12/1984 | Pribis | 350/632 |
| 4,538,851 | 9/1985 | Taylor | 350/631 |
| 4,718,755 | 1/1988 | Olson et al. | 350/582 |
| 4,898,458 | 2/1990 | McDonald | 350/584 |

Primary Examiner—Bruce Y. Arnold
Assistant Examiner—Thong Nguyen
Attorney, Agent, or Firm—Dennis K. Sullivan

[57] ABSTRACT

A side mounted rear view mirror assembly for a motor vehicle is provided with a small air deflector integral therewith disposed upstream of and parallel to a forwardly convex mirror housing of the assembly, the deflector being spaced therefrom a sufficient distance to cause the air stream to be smoothly channelled past the lateral edges of the mirror housing. The "see through" open portion of the mirror assembly between the deflector and the mirror housing is provided with an amber light reflecting side marker surface on the front of the mirror housing and a low intensity light disposed on the rear side of the air deflector and shining light onto the light reflecting surface of the mirror housing to become a side marker to indicate the side of the vehicle. The rear side of the mirror housing is provided with a conventional image reflecting surface to reflect a rear side view to the operator.

13 Claims, 2 Drawing Sheets

AERODYNAMIC DEFLECTOR FOR A REAR VIEW MIRROR WITH AN INTEGRAL SIDE MARKER LIGHT

This invention relates to a rear view mirror for a motor vehicle and, more particularly, to a rear view mirror assembly with an integral air deflector to streamline air flow about the rear view mirror assembly and reduce vibrations without significantly interfering with the driver's view of the area beyond the mirror and also incorporating a side marker light of low intensity to avoid blinding or distracting the vehicle operator.

THE PRIOR ART

Normally, exterior rear view mirrors are provided on motor vehicles, such as highway trucks, to provide the operator with a view rearwardly of the vehicle to indicate trailing traffic as well as to assist the operator in backing up of the vehicle. Unfortunately, because the mirror must protrude from the side of the truck into the airstream running alongside the truck, it can have a drastic effect on the aerodynamics and thus on fuel economy, at least for vehicle that travel at highway speeds. Although there have been mirrors, including large truck mirrors, designed to have an aerodynamic shape, the problem is that to get minimum air flow separation from the mirror surface and thus the best aerodynamic design, it was felt necessary to lengthen the mirror housing in the direction of travel to more gradually split the air flow around the mirror. However, especially in a medium or heavy duty truck, lengthening the mirror housing would also obstruct the driver's view of the street adjacent the left front side of the truck since the truck cab and the mirror are positioned much higher than, for example, the mirror on an automobile.

It is well known that highway trucks are required to have side marker lights for highway operation. At least to a point, the brighter these lights are the more visible the truck becomes to other vehicles. Although marker lights have no doubt been previously mounted on side view mirrors of heavy trucks, it is evident that bright lights mounted in this location would be disturbing to the operator.

SUMMARY OF THE INVENTION

Accordingly, it is the primary object of the invention described and claimed herein to provide an aerodynamic rear view mirror having minimal interference with the driver's view of the area therebehind.

A more specific object of the invention is to provide a mirror with an integral air deflecting structure disposed forwardly of the mirror with a substantially open space between the deflecting structure and the mirror to enhance driver visibility therethrough.

Another primary object of the invention described and claimed herein is to provide a side mounted rear view mirror wherein the side of the mirror away from the operator includes a lit reflective surface thereby providing a marker light.

It is yet another object of this invention to provide a rear view mirror having an integral aerodynamic air deflector and an integral side marker light to indicate width of vehicle.

It is a more specific object of this invention to provide a rear view mirror with a vehicle side marker light of low intensity shining on a reflective amber surface to show the width of the vehicle.

The objects of this invention are accomplished by providing a mirror assembly including a small air deflector integral therewith disposed upstream of and parallel to the mirror housing and spaced therefrom a sufficient distance to cause the air stream to be smoothly channelled past the lateral edges of the forwardly convex mirror housing. The open portion of the mirror assembly between the deflector and the mirror housing is provided with an amber light reflecting side marker surface on the front of the mirror housing and a low intensity light disposed on the rear side of the air deflector and shining light onto the light reflecting surface of the mirror housing to become a side marker to indicate the width of the vehicle. The rear side of the mirror housing is provided with a conventional image reflecting surface to reflect a rear side view to the operator.

BRIEF DESCRIPTION OF THE DRAWINGS

Other objects and advantages of the invention will become more apparent upon a perusal of the detailed description thereof and upon reference to the drawings, in which.

DESCRIPTION OF THE PREFERRED EMBODIMENT

Figure 1:
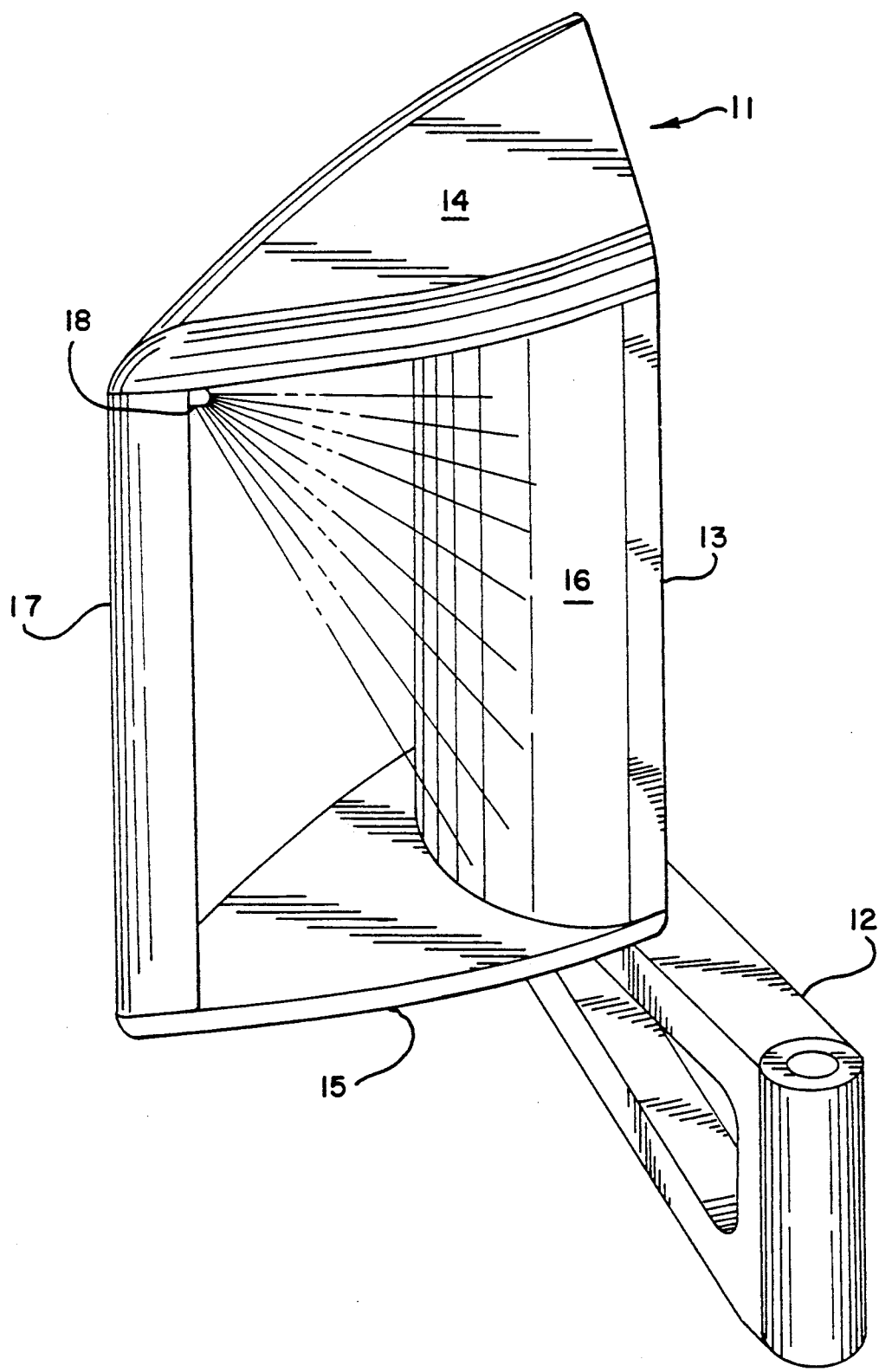
FIG. 1 is a perspective view of a vehicle mirror constructed in accordance with the present invention, together with its mounting bracket.
Figure 2:
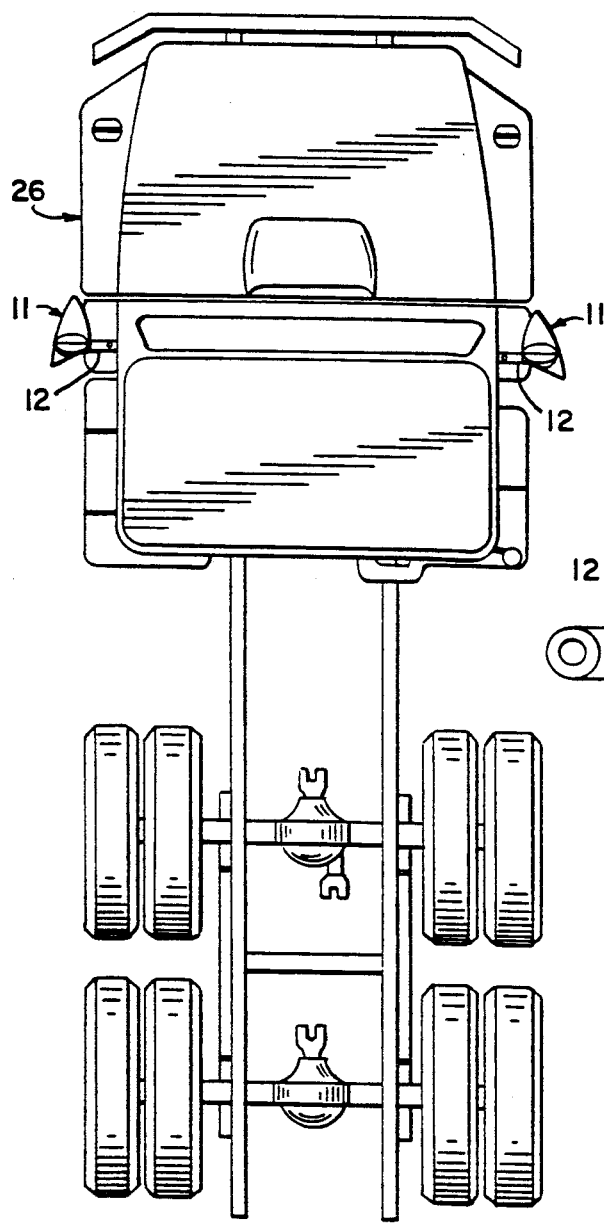
FIG. 2 is a top view of a truck and cab having the mirror of FIG. 1 mounted thereon.

Referring to the drawings, FIG. 1 shows a mirror assembly 11 mounted through a conventional adjustably fixed connection (not shown) on a bracket 12 which is used to mount a pair of mirror assemblies 11, one on each side of a truck 26 as shown in FIG. 2. A mirror housing 13 having a convex preferably semicylindrical vertical wall 16 facing the forward direction of travel of the truck 26 is mounted between an upper housing arm 14 and a lower housing arm 15, the convex wall 16 being provided with an amber colored light reflecting surface. A rearwardly facing mirror 25 is adjustably mounted in the housing 13 as is conventional.

A small air deflector 17 having a forwardly pointing V-shaped cross-section is mounted between the upper and lower housing arms 14 and 15 in parallel relation to the vertical wall 16 of the mirror housing 13. In this regard, as shown in FIG. 3, the air deflector 17 is spaced sufficiently from the mirror housing 13 that the air stream which is split by the front end of the air deflector will reattach to the convex surface of the vertical wall 16 of the mirror housing at a point thereon adjacently forward of the rear edge thereof so that the air stream is guided around the mirror with a minimum of disturbance of the surrounding air.

The air deflector 17 is further provided on its rear side adjacent the upper housing arm 14 with a low intensity light 18 disposed to shine its light across the entire reflecting surface provided on vertical wall 16 on the front of the mirror housing 13. A second light could be provided adjacent the lower arm 15 if one light is not sufficient but this is not desirable because the light may shine more easily on the operator. The combination of the light 18 shining on the reflecting surface 16 provides a side marker indicating the width of the mirror and the vehicle when the light is on.

Figure 3:
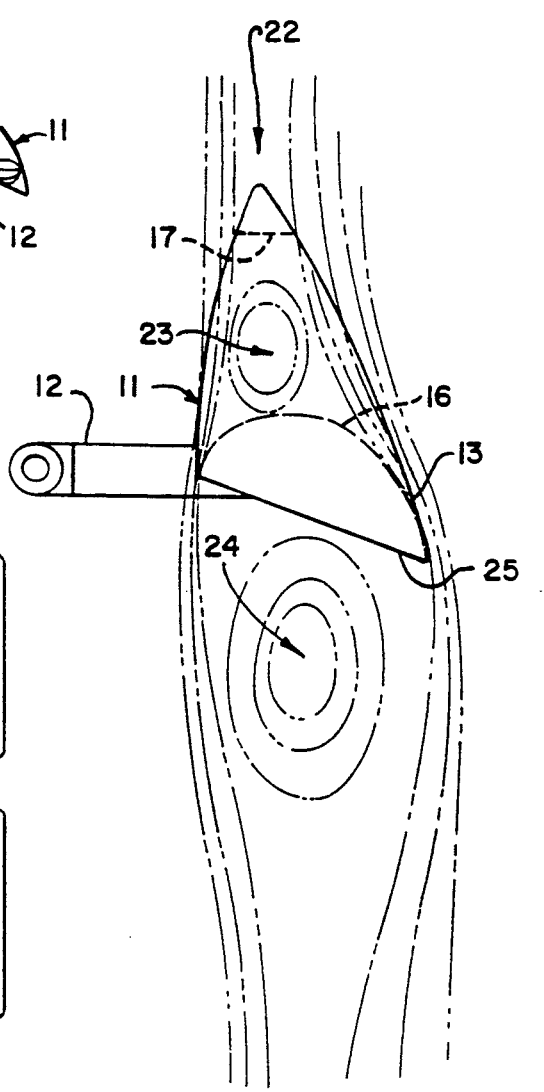
FIG. 3 is a top view of the mirror showing the aerodynamic operation of the mirror.

Referring to FIG. 3, air stream lines are provided to show the air stream 22 created by the forward travel of the truck as it passes the mirror assembly 11. As the air stream contacts the air deflector 17, it is turned and split before it strikes the mirror housing 13. As noted above, the airstream reattaches to the convex forward wall of the housing forwardly adjacent the rear edges to provide the minimum disturbance of the surrounding air. Because the area in between the deflector 17 and the mirror housing 13 is open, a standing vortex 23 may occur between the split air streams immediately behind the air deflector, the vortex being stabilized by the mirror housing and having little effect on the drag of the mirror assembly. The smoother flow past the edges of the housing also reduces the size of the turbulent wake 24 formed behind the mirror and thus reduces the air drag. The image reflecting surface 25 of the mirror can be adjusted relative to the housing through a conventional mounting means, such as adjacent spring loaded spherical segments, disposed therebetween to provide an image form the proper direction of the vehicle and align this with observation by the operator. By providing adjustments between the mirror and housing and also between the mirror assembly and the bracket 12, the position of the air deflector relative to the air stream and mirror housing can be adjusted for maximum aerodynamic drag reduction while permitting adjustment of the image in the mirror.

The provision of the air deflector 17 streamlines the mirror assembly and reduces resistance to the air stream as it passes around the mirror. It also reduces vibrations which may be caused by the air stream passing around the mirror and further provides better forward visibility for the operator because of the minimum structure necessary for the rear view mirror assembly.

Thus there has been provided, in accordance with the invention, an aerodynamic deflector for a vehicle mirror with integral side marker light which fully meets the objects, aims, and advantages set forth above. It will be recognized by those of ordinary skill in the art that various modifications and alterations may be made in the described embodiment without departing from the true nature of the invention. For example, as alluded to above, the low intensity light could be positioned at other locations within the opening while still obtaining much or all of the side marker reflecting effect provided by the mirror assembly described. Accordingly, it is intended to cover all such modifications and alterations as fall within the spirit and scope of the appended claims.

What is claimed is:

1. An aerodynamic side-mount rear view mirror assembly for a highway vehicle having a forward direction of travel comprising:
   a mirror housing having a vertical forward surface and an image reflecting rearward surface;
   mounting arm means attached to said mirror housing and extending forwardly thereof; and,
   a vertically extending air deflector attached to said mounting arm means and disposed parallel to the spaced from said housing forward surface to define an open area permitting vision through the mirror assembly therebetween, said air deflector having a V-shaped cross section pointing forwardly in the direction of travel of said vehicle.

2. The invention in accordance with claim 1 wherein said forward surface of said mirror housing is convex in the direction of travel and said air deflector is disposed sufficiently forward of said mirror housing to cause an air stream to attach to said convex surface adjacently forward of a rear edge thereof.

3. The invention in accordance with claim 1 and said forward surface of said mirror housing comprising an exteriorly visible light reflecting surface, and a light disposed within said open area to illuminate said light reflecting surface.

4. The invention in accordance with claim 3 and said light being disposed adjacent to the rear side of said air deflector.

5. A rear view mirror assembly having a side marker light for a vehicle comprising:
   a mounting bracket for supporting the mirror assembly on said vehicle;
   a mirror housing mounted on said bracket, said housing having a light reflecting surface on the front portion thereof, and a mirror supported within said housing and providing an image reflecting surface on the rear of said mirror housing;
   an air deflector disposed forwardly of said mirror housing for deflecting air around said mirror housing, and defining therewith an open area permitting vision through the mirror assembly therebetween; and,
   a light mounted to said mirror assembly in said open area adjacent said air deflector and disposed to direct light on said light reflecting surface thereby providing an exterior indication of the side of the vehicle.

6. The invention in accordance with claim 5 wherein said mirror housing is adjustably mounted to said mounting bracket thereby providing an adjustment of said air deflector relative to said mirror housing.

7. The invention in accordance with claim 6 wherein said mirror is adjustably mounted in said housing for adjusting the image reflected by said mirror.

8. A rear view mirror having a side marker light for a vehicle comprising:
   a mirror housing mounted on a bracket, said housing having a light reflecting surface on an exterior surface of the front portion thereof, and a mirror supported within said housing and providing an image reflecting surface on the rear of said mirror housing;
   a support structure disposed forwardly of said mirror housing; and,
   a light mounted on said support structure and spaced forwardly of the front portion of said housing, said light being disposed in direct light on said light reflecting surface and provide an exterior indication of the side of the vehicle.

9. The invention in accordance with claim 8 wherein said support structure and said mirror housing define a tapered housing assembly having an open space therebetween.

10. The invention in accordance with claim 9 wherein said support structure includes a V-shaped air deflector disposed thereon parallelly forward of said mirror housing in forward pointing relation for splitting an air stream to pass around the mirror housing.

11. The invention in accordance with claim 9 wherein the light is positioned in a forward end of said housing assembly.

12. The invention in accordance with claim 8 wherein the light reflecting surface on the front of said mirror housing defines a convex surface to radiate light in various directions.

13. The invention in accordance with claim 8 wherein the light reflecting surface is semicylindrical and amber in color to reflect an amber light from the side marker light.

* * * * *